March 3, 1931.  L. E. LONG  1,794,912
WELDING APPARATUS
Filed July 29, 1927   3 Sheets-Sheet 1
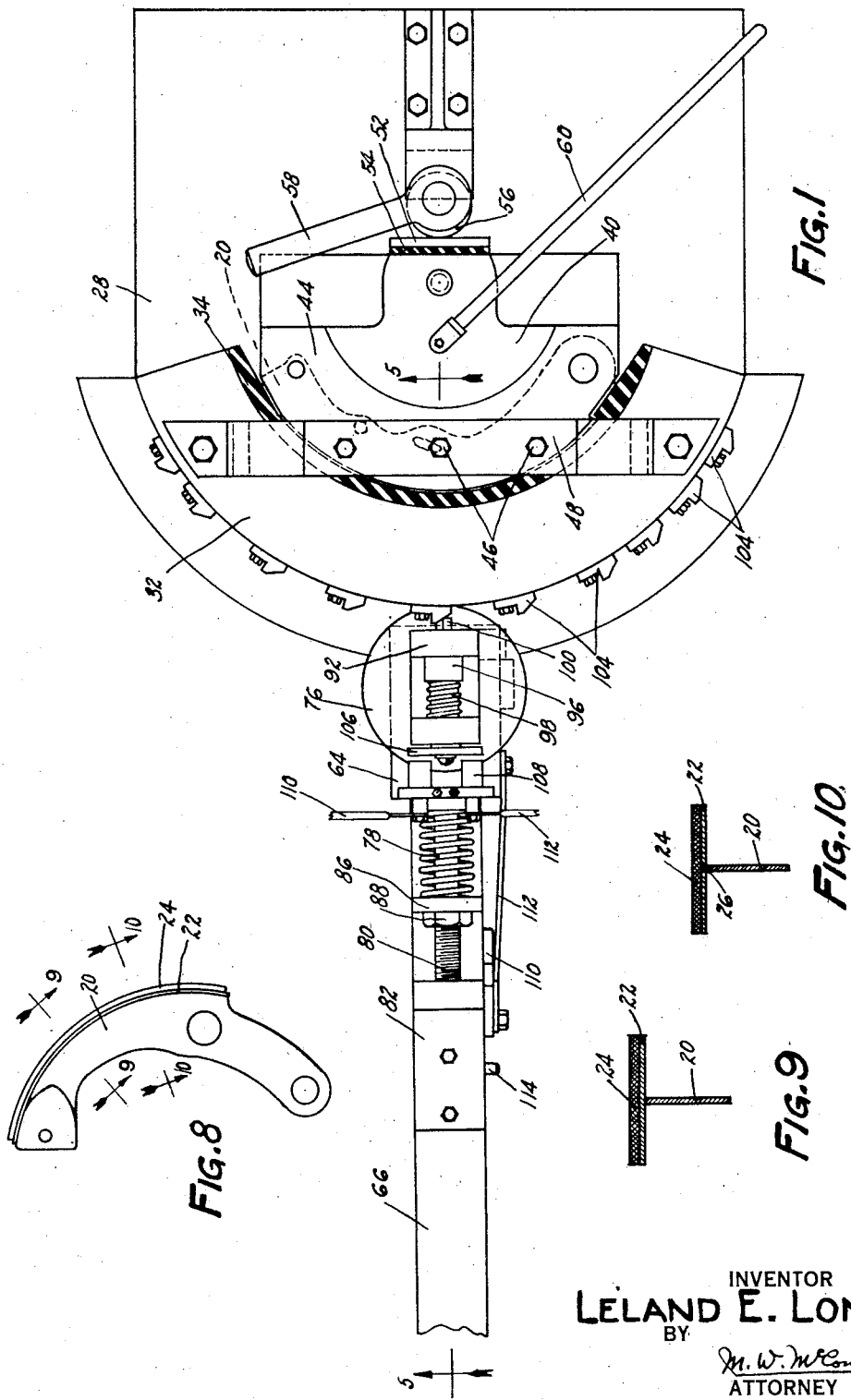
INVENTOR
LELAND E. LONG
BY
M. W. McConkey
ATTORNEY

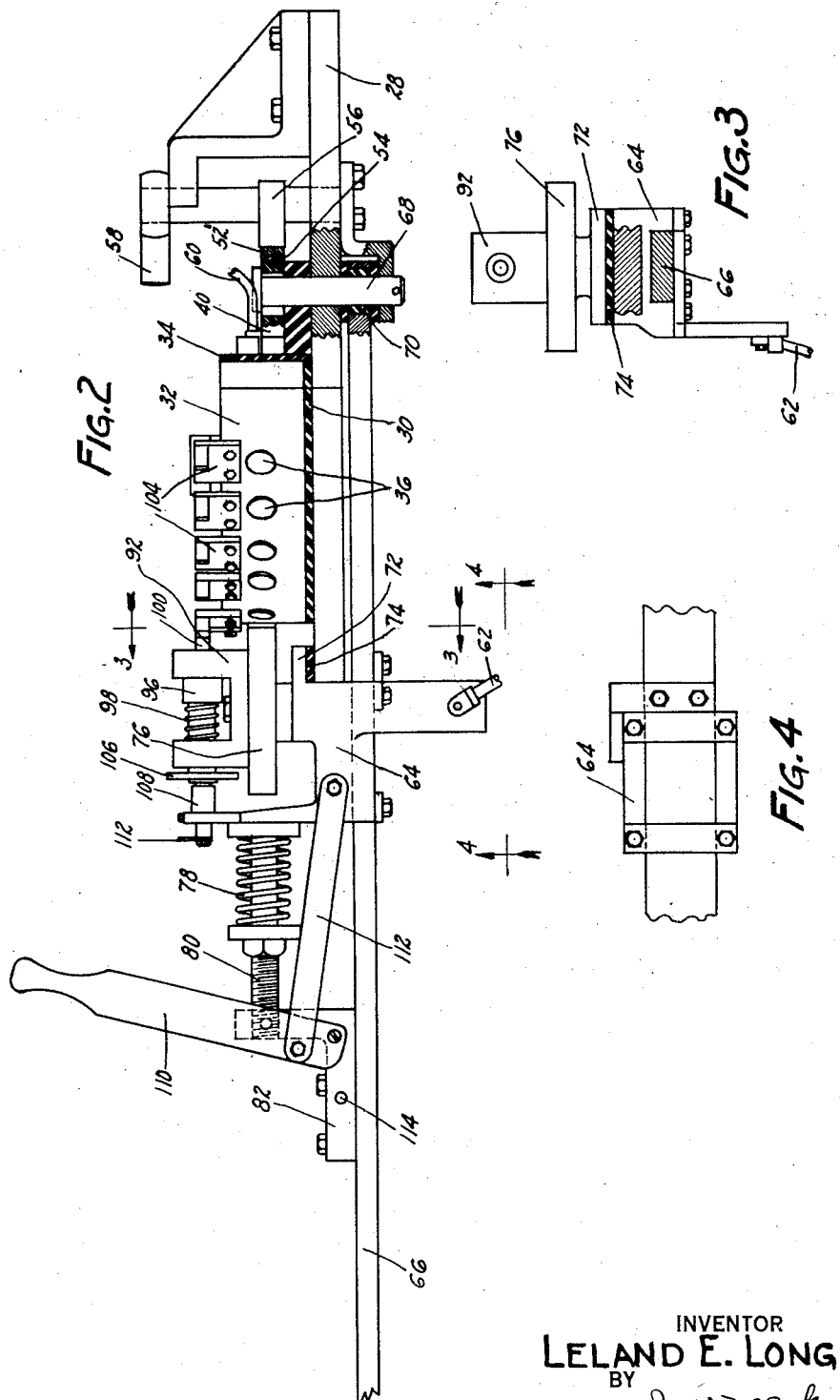

March 3, 1931. L. E. LONG 1,794,912
WELDING APPARATUS
Filed July 29, 1927 3 Sheets-Sheet 3

INVENTOR
LELAND E. LONG
BY
M. W. McConkey
ATTORNEY

Patented Mar. 3, 1931

1,794,912

UNITED STATES PATENT OFFICE

LELAND E. LONG, OF SOUTH BEND, INDIANA, ASSIGNOR TO BENDIX BRAKE COMPANY, OF CHICAGO, ILLINOIS, A CORPORATION OF ILLINOIS

WELDING APPARATUS

Application filed July 29, 1927. Serial No. 209,229.

This invention relates to apparatus for welding and is illustrated as embodied in manually operated apparatus for welding together the web and rim of the brake shoe. An object of the invention is to provide simple means for welding these two parts together, preferably by a series of spot welds, for example by utilizing a series of angularly arranged electrodes which are successively energized and which form the respective spot welds connecting the rim to the web.

Various other features of novelty relate to different parts of the mechanical construction of the apparatus, especially in the arrangement of the electrodes and in the provision of novel circuit controlling means for the electrodes, and also in the construction and arrangement of a carriage controlling the welding and movable about the center of curvature of the brake shoe.

The above and other objects and features of the invention will be apparent from the following description of one illustrative embodiment shown in the accompanying drawings, in which:

Figure 1 is a top plan view of the apparatus;

Figure 2 is a side elevation of the apparatus partly broken away to show the pivotal mounting of the carriage;

Figure 3 is a section on the line 3—3 of Figure 2 showing the mounting of the carriage;

Figure 4 is a bottom plan view of the carriage looking in the direction of the arrows 4—4 in Figure 2;

Figure 8 is a side elevation of the finished brake shoe; and

Figure 5:
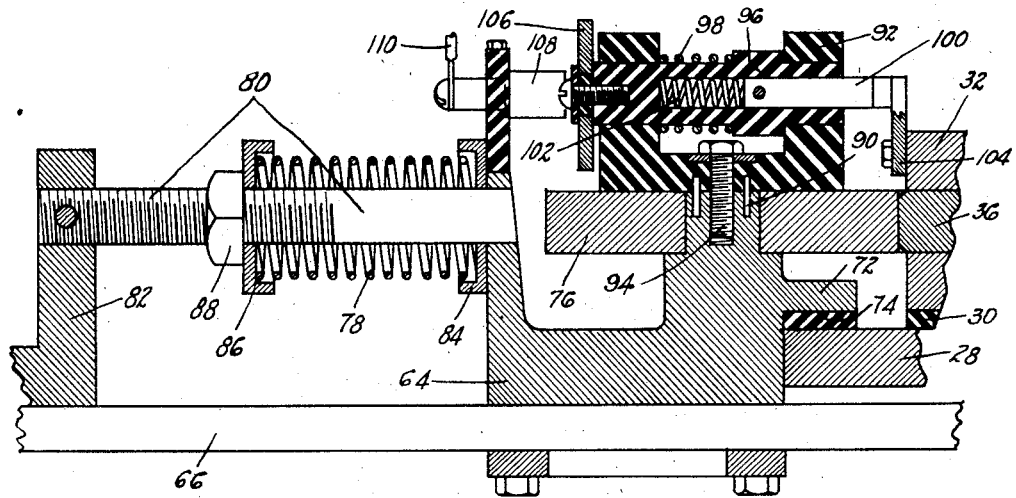
Figure 5 is a partial section through the apparatus on the line 5—5 of Figure 1.

Figures 9 and 10 are sections through the shoe respectively on the lines 9—9 and 10—10 of Figure 8.

The brake shoe intended to be manufactured with the novel welding apparatus is shown in Figures 8, 9, and 10, and includes an arcuate flat web 20 and a substantially cylindrical outer rim or band 22 to which the brake lining 24 is riveted or otherwise secured and which is arranged with its inner face engaging the outer edge of the web 20. The web 20 may be formed with one or more projections or lugs 26 extending into openings in the rim 22 and taking the shearing strains tending to separate the rim from the web lengthwise of the shoe. Preferably there are three of these lugs 26, one at each end of the rim 22 and one at its center. The rim is preferably secured to the web by a series of spaced spot welds formed by the apparatus described below.

Figure 6:
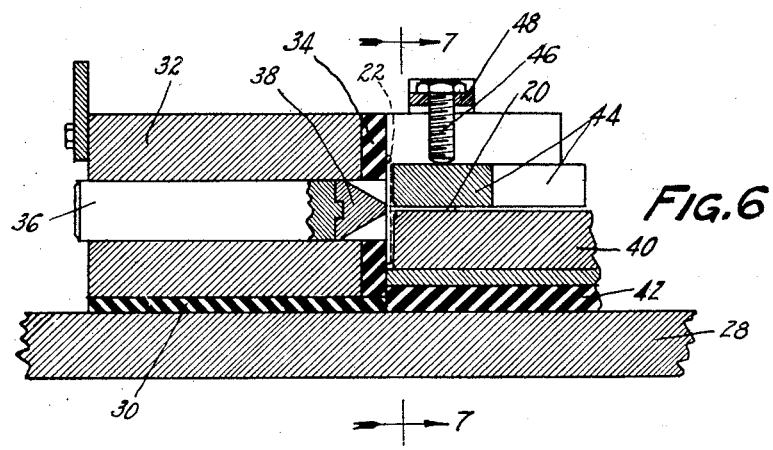
Figure 6 is a partial section on the same line through the parts immediately at the right of the parts shown in Figure 5.

The welding apparatus, in the form illustrated, includes a table or base 28 on which is mounted a block of insulation 30 on the top of which is secured an arcuate block or carrier 32 faced with a concave cylindrical strip of insulation 34 which engages the outer face of the rim 22, and which is formed with radial openings for a series of electrodes 36 engaging the outer face of the rim 22 opposite the edge of the web 20. As best shown in Figure 6, the electrodes 36 may if desired be provided with readily renewable tips 38 which are generally conical or pyramidal in form so that there is a restricted area in engagement with the rim 22.

Figure 7:
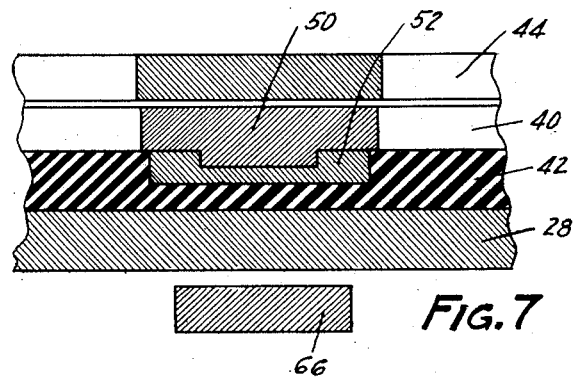
Figure 7 is a section through the parts shown in Figure 6 on the line 7—7 of Figure 6.

The web 20 is held by a clamp including an arcuate block 40 resting on a block of insulation 42, and an upper or clamping block 44 forced firmly against the upper side of the web 20 by clamp screws 46 in a yoke 48 which is secured at its ends to the block 32. In order to facilitate the assembly and removal of the shoes, the block 40 is arranged with a tongue 50 (Figure 7) slidably seated in a groove in the top of a metal bar 52 seated in the insulation 42 so that the carriage or block 40 may be slid forwardly and backwardly along the center line of Figure 1. At the rear of the apparatus the carriage or block 40 is provided with a thrust plate 52' insulated from the block by interposed insulating material 54 and engaged by an eccentric or cam 56 which can be operated to force the device to the left in Figure 1, by a handle 58, so as to clamp the web and rim firmly against the arcuate block 34 of insulating material.

The clamp blocks 40 and 44 also serve as one of the electrodes of the apparatus in transmitting the current to the web 20 for forming the welds between that web and the rim 22. To this end an electrical conductor 60 is secured to the block 40 as shown in Figures 1 and 2.

The other lead for the welding current is in the form of a wire or conductor 62 secured to a carriage 64 slidably embracing an operating lever 66 pivoted at the center of curvature of the brake shoe on a pin or pivot 68 which is insulated from the lever by suitable bakelite washers or the like 70. Carriage 64 has a ledge or flange 72 slidably resting on an arcuate piece 74 of insulating material seated on the outer edge of the base 28. This carriage is formed with an outwardly projecting portion which serves as a bearing for a roller 76 held under heavy spring pressure against the rear face of the block 32 and successively forced against the rear ends of the electrodes 36 to urge them under heavy spring pressure against the rim 22 while the welding current passes through the rim and web to form the successive spot welds.

The spring pressure acting on the roller 76 is provided by a heavy coil spring 78 sleeved on a rod 80 supported at one end in a bracket 82 bolted to the upper face of the lever 66 and slidably supported at its opposite end in an opening in the carriage 64. The spring 78 is confined between a washer 84 engaging the face of the carriage 64 and a washer 86 held by a nut 88 adjustably threaded on the member 80.

Just above the roller 76 and held against turning with the roller by pins 90 (Figure 5) is a block of insulation 92 secured to the carriage 64 by a tap screw 94 and formed with outwardly projecting arms having openings for the ends of a plunger 96 of insulating material which is shouldered to engage the left-hand face of the right-hand arm of the member 92 (Figure 5) and which is urged toward the right in Figure 5 by a coil spring 98 confined between the shouldered part of the plunger 96 and the left-hand arm of the member 96. Within the member 92 is a bore for a metallic plunger 100 urged outwardly by a coil spring 102 and having a wedge or cam face to engage a complementary face on an operating cam 104, a series of which are arranged on the block 32, one of them above each electrode 36. Just as the roller 76 comes fully over one of the electrodes 36, the corresponding cam member 104 acts on the plunger 100 to force the plunger 96 to the left in Figure 5 against the resistance of the spring 98, in such a manner as to carry a metallic washer or switch 106 into engagement with two electric contacts 108 to bridge the space between them and close a circuit between two wires 110 and 112. The circuit thus closed may be either the welding circuit itself or may be a circuit controlling a relay switch for the welding circuit, but preferably is the primary circuit of a transformer or coil the secondary circuit of which is the welding circuit passing through the connections 60 and 62.

In the operation of the device, the parts of the shoe are assembled and clamped into place by the operation of screws 46 and the lever 58, when the lever 66 is arranged nearly at right angles to the position shown in Figure 1. Thereafter the lever 66 is swung through an arc of nearly 180°, and as the roller 76 passes over each of the electrodes 36 it forms a closed electric contact throughout the welding circuit by the yielding action of spring 78, while at the same time the member 106 closes the welding circuit for an instant and forms a spot weld at that point. Thus, as lever 66 is swung through its arc the various spot welds are successively formed until the welding of the shoe is completed by the time the lever has reached the end of this arc.

In order to prevent the cam members 104 from interfering with the return of lever 66 to its initial position, and also to prevent the closing of the welding circuit during this return movement, the carriage 64 is withdrawn along the lever 66 against the resistance of the spring 78 by a lever 110 pivoted on one side of the bracket 82 and connected to the carriage by a link 112. The lever 111 and the link 112 are so connected as to form in effect a toggle which passes just beyond its central position when the lever 110 engages a stop 114 on the bracket 82 so that the spring 78 at this time acts to hold the carriage 64 withdrawn until the toggle is broken by lifting the lever 110 when another shoe is to be welded.

While one illustrative embodiment has been described in detail, it is not my intention to limit the scope of the invention to that particular embodiment or otherwise than by the terms of the appended claims. My applications Nos. 173,819, 203,928, 199,989 and 254,942, all owned by Bendix Brake Company, relate to this general subject-matter.

I claim:

1. Welding apparatus comprising, in combination, an electrode arranged to engage a web having a rim in engagement therewith, a series of electrodes engaging the rim opposite the edge of the web, and means for passing current through said electrodes to form a series of spaced spot-welds securing the rim to the web.

2. Welding apparatus comprising, in combination, an electrode arranged to engage a web having a rim in engagement therewith, a series of electrodes engaging the rim opposite the edge of the web, and means for passing current through the electrodes of said series, one after the other, to form a series of spaced spot-welds securing the rim to the web.

3. Welding apparatus comprising, in combination, an electrode arranged to engage a web having a rim engaging its outer edge, another electrode engaging the rim opposite the edge of the web, means for yieldingly forcing the second electrode against the rim, and means automatically operative to pass current between the electrode when the second electrode is forced against the rim.

4. Welding apparatus comprising, in combination, an electrode arranged to clamp and hold the web of an arcuate brake shoe with a rim engaging its outer edge, another electrode engaging the rim opposite the edge of the web, and means movable about the center of the curvature of the brake shoe for passing current between the two electrodes.

5. Welding apparatus comprising, in combination, an electrode arranged to clamp and hold the web of an arcuate brake shoe with a rim engaging its outer edge, an arcuate series of electrodes engaging the rim opposite the edge of the web, and means movable about the center of the curvature of the brake shoe for passing current successively through one after another of the electrodes of said series and through the first electrode.

6. Welding apparatus comprising, in combination, an electrode arranged to clamp and hold the web of an arcuate brake shoe with a rim engaging its outer edge, another electrode engaging the rim opposite the edge of the web, and means movable about the center of the curvature of the brake shoe for passing current between the two electrodes, said means also being operative to force the first electrode firmly against the rim.

7. Welding apparatus comprising, in combination, an electrode arranged to clamp and hold the web of an arcuate brake shoe with a rim engaging its outer edge, an arcuate series of electrodes engaging the rim opposite the edge of the web, and means movable about the center of the curvature of the brake shoe for passing current successively through one after another of the electrodes of said series and through the first electrode, said means also being operative to force the first electrode firmly against the rim.

8. Welding apparatus comprising, in combination, an electrode arranged to clamp and hold the web of an arcuate brake shoe with a rim engaging its outer edge, another electrode engaging the rim opposite the edge of the web, and means movable about the center of curvature of the brake shoe for yieldingly forcing the second electrode against the rim of the shoe.

9. Welding apparatus comprising, in combination, an electrode arranged to clamp and hold the web of an arcuate brake shoe with a rim engaging its outer edge, an arcuate series of electrodes engaging the rim opposite the edge of the web, and means movable about the center of curvature of the brake shoe for yieldingly forcing one after another of the series of electrodes against the rim of the shoe.

10. Welding apparatus comprising, in combination, an electrode arranged to clamp and hold an arcuate web having a substantially cylindrical rim engaging its outer edge, an arcuate member paralleling said rim on the side opposite the web and having a series of radially-movable electrode plungers engageable with the rim opposite the edge of the web, and means movable about the center of curvature of the rim for forcing one after the other of the electrode plungers against the rim.

11. Welding apparatus comprising, in combination, an electrode arranged to clamp and hold an arcuate web having a substantially cylindrical rim engaging its outer edge, an arcuate member paralleling said rim on the side opposite the web and having a series of radially-movable electrode plungers engageable with the rim opposite the edge of the web, and means movable about the center of curvature of the rim for forcing one after the other of the electrode plungers against the rim and for passing current through each plunger as it is forced against the rim.

12. Welding apparatus comprising, in combination, a normally-stationary holder for an arcuate web and rim arranged to serve as an electrode engaging the web, a carriage movable outside the rim in an arc about the center of curvature of the web and rim, and means operated during movement of the carriage for welding the rim to the outer edge of the web.

13. Welding apparatus comprising, in combination, a normally-stationary holder for an arcuate web and rim arranged to serve as an electrode engaging the web, a carriage movable outside the rim in an arc about the center of curvature of the web and rim, and means operated during movement of the carriage for securing the rim to the outer edge of the web by a series of spaced spot-welds.

14. Welding apparatus comprising, in combination, a lever provided with a carriage slidable thereon, a stop on said lever, a compression spring interposed between said carriage and stop and means for moving said carriage toward said stop against the resistance of said spring.

15. Welding apparatus comprising, in combination, an electrode arranged to engage a web having a rim in engagement therewith, a series of spaced electrodes engaging the rim opposite the edge of the web and means for passing current through said electrodes comprising a pivoted arm having means mounted thereon for contacting said series of electrodes, said means co-operating with a switch mechanism also mounted on said arm.

16. Welding apparatus comprising, in combination, a lever provided with a spring loaded carriage, said carriage supporting a member adapted to contact with an electrode, a stop on said lever and means for moving said carriage toward said stop against resistance of the spring.

17. In a welding apparatus, means for making electrical welds through the intermediary of electrodes contacting the work, comprising a standard provided with an electrode contacting roller and switch means mounted on said standard for automatically passing current through the electrodes to the work upon movement of said standard.

In testimony whereof, I have hereunto signed my name.

LELAND E. LONG.